(12) United States Patent
Haartsen

(10) Patent No.: US 7,480,490 B2
(45) Date of Patent: Jan. 20, 2009

(54) COEXISTENCE OF MULTIPLE RADIO SYSTEMS IN UNLICENSED BANDS

(75) Inventor: Jacobus C. Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 422 days.

(21) Appl. No.: 11/021,164

(22) Filed: Dec. 24, 2004

(65) Prior Publication Data

US 2005/0181823 A1    Aug. 18, 2005

Related U.S. Application Data

(60) Provisional application No. 60/543,543, filed on Feb. 12, 2004.

(51) Int. Cl.
*H04B 1/38* (2006.01)
(52) U.S. Cl. .................... 455/73; 455/41.2; 455/88; 455/553.1; 370/338; 370/352; 370/468
(58) Field of Classification Search ............. 455/41.1, 455/41.2, 552.1, 553.1, 73, 88, 450, 464; 370/352, 468, 338
See application file for complete search history.

(56) References Cited

U.S. PATENT DOCUMENTS

| | | | | |
|---|---|---|---|---|
| 5,761,243 | A * | 6/1998 | Russell et al. ............... | 375/233 |
| 5,862,452 | A | 1/1999 | Cudak et al. | |
| 6,256,478 | B1 | 7/2001 | Allen et al. | |
| 2003/0120809 | A1 | 6/2003 | Bellur et al. | |
| 2003/0157912 | A1 * | 8/2003 | Atkinson et al. ......... | 455/234.1 |
| 2003/0181213 | A1 | 9/2003 | Sugar et al. | |
| 2004/0095907 | A1 * | 5/2004 | Agee et al. .................. | 370/334 |
| 2004/0180622 | A1 * | 9/2004 | Godfrey .................... | 455/41.2 |
| 2005/0058121 | A1 * | 3/2005 | Santhoff et al. ............. | 370/352 |

FOREIGN PATENT DOCUMENTS

EP    0716514 A1    6/1996

(Continued)

OTHER PUBLICATIONS

PCT International Search Report dated May 24, 2005 in connection with International Application No. PCT/EP 2005/001199.

(Continued)

*Primary Examiner*—Tuan A Pham
(74) *Attorney, Agent, or Firm*—Potomac Patent Group PLLC

(57) ABSTRACT

A transceiver operates in a communication environment capable of including other transceivers, wherein the transceiver sends and receives traffic in accordance with a first communications standard, and other transceivers send and receive traffic in accordance with other communication standards that are incompatible with the first communications standard such that traffic sent in accordance with any of the first and other communications standards cannot be received by a receiver operating in accordance with any other one of the first and other communications standards. The transceiver identifies a carrier frequency for use as a shared broadcast channel that is accessible by the transceiver and by the other transceivers, and broadcasts information on the shared broadcast channel, wherein the information informs the other transceivers of the presence of the transceiver. The transceiver also receives information from the shared broadcast channel, wherein the information informs the transceiver of the presence of the other transceivers.

41 Claims, 9 Drawing Sheets

FOREIGN PATENT DOCUMENTS

| | | |
|---|---|---|
| EP | 1098477 A1 | 5/2001 |
| EP | 1176762 A1 | 1/2002 |
| EP | 1185038 A2 | 3/2002 |

OTHER PUBLICATIONS

PCT Written Opinion dated May 24, 2005 in connection with International Application No. PCT/EP 2005/001199.

Proakis, "Digital Communications," 2nd Edition, McGraw-Hill, 1989 (ISBN 0-07-100269-3).

Raychaudhuri, D. et al., "A Spectrum Etiquette Protocol for Efficient Coordination of Radio Devices in Unlicensed Bands," Proceedings of the 14th IEEE International Symposium on Personal, Indoor Mobile Radio Communications, Beijing, China, Sep. 2003, pp. 172-176.

* cited by examiner

| standard | modulation | symbol time (μs) | moduation index |
| --- | --- | --- | --- |
| Bluetooth | GFSK | 1.0 | 0.3 |
| ZigBee | MSK | 0.5 | 0.5 |
| WiFi 802.11 | QPSK | 0.0909 | 0.5 |
| WiFi 802.11b | QPSK | 0.0909 | 0.5 |
| WiFi 802.11g | QPSK | 4.0 | 0.5 |

FIG. 6

COEXISTENCE OF MULTIPLE RADIO SYSTEMS IN UNLICENSED BANDS

CROSS REFERENCE TO RELATED APPLICATIONS

This application claims the benefit of U.S. Provisional Application No. 60/543,543, filed Feb. 12, 2004, which is hereby incorporated herein by reference in its entirety.

BACKGROUND

The invention relates to radio communication systems. More particularly, operation of multiple radio systems in similar radio spectrums and/or located geographically near to each other.

When a few decades ago, spectrum regulations were changed to allow commercial radio applications in unlicensed bands, interest was marginal. But this interest has changed radically in the last few years. After the worldwide success of mobile telephony in licensed bands, capacity limitations and huge license fees have spurred the interest of radio applications in the unlicensed band. In the past few years, communications systems such as those operating in accordance with the Wireless Local Area Network (WLAN) IEEE 802.11 standards and the Bluetooth® standards have been increasingly deployed in the 2.4 GHz band. Moreover, new communications systems are being worked on, such as Zig-Bee and those resulting from the Wireless Personal Area Network (WPAN) activity under IEEE 802.15.

Radio spectrum, even unlicensed, is limited. Despite this, ubiquitous communications using several different standards is foreseen in the near future. Coexistence is not trivial as different standards follow different protocols. Moreover, regulations, initially intended to provide fair sharing, are constantly changing to allow for higher data rates, yet moving away from robustness requirements. The use of an unlicensed band poses the challenge of coexistence. In the design phase of a new communication system that has to operate in the unlicensed band, the developer has to design units that will be expected to share the band with:

Incumbent non-communications: Power unintentionally radiated by equipment, for example microwave ovens, will be a source of disturbance.

Incumbent communications: Intended radiation by other communication systems like for example WLAN, Bluetooth®, or Radio Frequency-Identification (RF-ID) will also be experienced as disturbance when no coordination is applied.

Future systems: Systems that do not exist yet but which will be built in the future can cause severe disturbances. The only known factors are the restrictions imposed upon these systems by the regulations. However, as discussed before, regulations are changing over time, making predictions rather unreliable.

In general, the performance (say the packet-error-rate PER) of a communication system is determined by seven variables $$PER=H(P_u, B_u, R_u, d_u, P_j, B_j, d_j)$$

where H is a monotonically increasing function for each of the parameters except $P_u$; for the parameter $P_u$, H is a monotonically decreasing function. In this formula, $P_u$, $P_j$ are the transmit power levels of the intended and jamming transmitters, respectively; $B_u$, $B_j$ are the respective intended and jamming transmission bandwidths; and $d_u$, $d_j$ are the respective intended and jamming duty cycles. $R_u$ is the user information rate. Furthermore, the quality of the reception is a function of environmental factors that determine the final received signal strength of both the intended and jamming signals. Of great importance are the distances between intended transmitter and receiver, and between the jamming source and receiver. In addition other effects impact the propagation of the signals such as obstructions (shadowing), reflections, refraction, and wave guide effects to name a few. If both the intended and jamming transmitters send simultaneously on the same frequencies, the performance will depend on the Signal-to-Interference ratio (S/I) between intended and interfering power experienced at the receiver. Larger power levels, $P_u$, of the intended transmitter give greater protection against interference, as long as the distance between intended transmitter and receiver are not too large. Vice versa, shorter distances guarantee a larger received signal that can overcome interference. The current trends of designing more sensitive receivers in order either to increase the range or to reduce the required transmit power, do not have a positive effect on the robustness of the system.

The ratio $B_u/R_u$ is a measure of the processing gain or coding gain of the system: a lower information rate allows for more overhead in order to combat interference either by signal spreading or by coding. The wider the bandwidths $B_u$, $B_j$, the higher the probability of overlap in the frequency domain. Increasing bandwidths also decreases the possibility of avoiding each other's transmissions in frequency. The larger the duty cycles $d_u$, $d_j$, the larger the probability of overlap in the time domain. Increasing the duty cycles also decreases the possibility of avoiding each other's transmissions in time.

Interference mitigation by applying direct-sequence spreading or forward-error-correction coding can be useful, but is usually insufficient due to the near-far problem. That is, in ad-hoc scenarios in particular, a jamming transmitter can come very close to a receiver. The power levels received can thus be sufficiently strong to bring the front-end of the receiver into saturation, which causes clipping. As a result of the clipping (which imposes non-linear effects) the effective gain decreases (desensitization) and intermodulation products arise.

Avoidance is another method of mitigating interference. Avoidance in time can be applied by listening-before-talk or Carrier Sense Multiple Access/Collision Avoidance (CSMA/CA) as applied in IEEE 802.11 and other standards. However, this renders suboptimal solutions because the collision measurements render absolute power levels whereas the Packet Error Rate (PER) depends on the Carrier-to-Interference (C/I) ratio.

Avoidance in frequency is provided by frequency agile techniques such as Dynamic Frequency Selection (DFS). In this method, the system measures where in the frequency band other transmitters are active, and subsequently avoids these frequency segments. This is fine when potential jammers broadcast their presence continuously, for example on a control channel. However, measuring on bursty data channels results in unreliable measurements. Hopping provides better mitigation methods based on frequency avoidance. Because of the large isolation between the intended signal and the jammer when the hopper and jammer do not coincide, rather good robustness can be obtained. However, frequency hopping only works when the jammers are narrowband; likewise, time hopping only works when jammers have a low duty cycle. Incumbent systems in the unlicensed bands usually are bandwidth restricted but are rarely duty cycle restricted, posing a problem for time hopping systems like Ultra-Wideband (UWB) Impulse Radio.

As the usage of the unlicensed bands is intensified, coexistence problems increase. On the other hand, with the increased need for ensuring application-specific minimum quality-of-service levels (e.g., in audio and video communication), the need for a clean and interference-free channel is desired more than ever. To date, non-collaborative techniques have been discussed to address these issues. In non-collaborative techniques, of which CSMA, DFS, and even spreading are examples, each system operates autonomously in order to minimize the impact of interference imposed by others. Collaborative techniques on the other hand, require systems to communicate with each other in order to find an optimal solution where mutual interference is minimal. Transceivers using the same standard can communicate with each other, but the same is not generally true when transceivers designed for operation in accordance with differing systems are considered.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

A first transceiver is operated in a wireless communication environment capable of including one or more other transceivers, wherein the first transceiver sends and receives traffic in accordance with a first communications standard, and one or more of the one or more other transceivers send and receive traffic in accordance with one or more other communication standards that are incompatible with the first communications standard such that traffic sent in accordance with any of the first and other communications standards cannot be received by a receiver operating in accordance with any other one of the first and other communications standards.

In one aspect, operation of the first transceiver includes identifying a carrier frequency for use as a shared broadcast channel that is accessible by the first transceiver and by the one or more other transceivers; and broadcasting information on the shared broadcast channel, wherein the information informs the one or more other transceivers of the presence of the first transceiver.

In another aspect, such a transceiver receives information from the shared broadcast channel, wherein the information informs the first transceiver of the presence of the one or more other transceivers.

Each transceiver receiving such information may use it to adapt its operation so as to reduce interference to and/or from the other transceivers operating in the environment.

In yet another aspect, identifying the carrier frequency includes scanning a predefined radio band to determine whether any of the one or more other transceivers have broadcast information on the shared broadcast channel.

In some embodiments, a frequency within the predefined radio band is selected, and the shared broadcast channel is established in response to determining that none of the other transceivers has broadcast information on the shared broadcast channel.

In still another aspect, the information comprises any one or any combination of the following:
an identifier of a carrier frequency that the first transceiver is using to communicate traffic;
an identifier of a bandwidth being occupied by the first transceiver;
an identifier of a duty cycle of operation on a radio spectrum by the first transceiver;
an identifier of a transmit power level being used by the first transceiver;
an identifier of a periodicity with which the information is being broadcast on the shared broadcast channel;
an identifier of a first point in time relative to another point in time, the first point in time being a point in time at which the information is being broadcast on the shared broadcast channel;
an identifier of a spreading factor being used by the first transceiver;
an identifier of a spreading code being used by the first transceiver and
an identifier of a characteristic of the first transceiver that enables the one or more other transceivers to adjust operation to achieve a reduction of interference with the first transceiver.

In yet another aspect, broadcasting information on the shared broadcast channel includes broadcasting a first segment on the shared broadcast channel by using a first signaling format to broadcast the information on the shared broadcast channel; and broadcasting a second segment on the shared broadcast channel by using a second signaling format to broadcast the information on the shared broadcast channel, wherein the first signaling format is different from the second signaling format. This aspect is useful when, for example, it is not possible to find sufficient commonalities between the various signaling formats of the different standards to enable all transceivers to receive a single format signal conveying the information on the shared broadcast channel.

In alternative embodiments, broadcasting the information on the shared broadcast channel includes using a signaling format that is used by all of the first and other transceivers to broadcast information on and receive information from the shared broadcast channel.

In yet other alternatives, broadcasting the information on the shared broadcast channel includes approximating a signaling format that is approximated by all of the first and other transceivers to broadcast information on and receive information from the shared broadcast channel.

In still other alternative embodiments, broadcasting the information on the shared broadcast channel includes using a continuous phase modulation (CPM) signaling format having a CPM modulation index that is larger than a largest CPM modulation index used by any of the first and other communications standards, and having a symbol time that is larger than the largest symbol time used by any of the first and other communications standards. The CPM signaling format may be, in some embodiments, a continuous phase frequency shift keying signaling format.

In some of these embodiments, approximating the continuous phase modulation (CPM) signaling format having the CPM modulation index that is larger than the largest CPM modulation index used by any of the first and other communications standards, and having the symbol time that is larger than the largest symbol time used by any of the first and other communications standards includes, for each bit of information contained in the information to be broadcast on the shared broadcast channel, substituting a corresponding symbol sequence; and supplying each corresponding symbol sequence to a transmitter unit operating in accordance with the first communications standard. In some embodiments where this is done, the transmitter unit includes a delta demodulator that generates a signal waveform to be transmitted.

In yet another aspect, the first transceiver operates in a first frequency band, and at least one of the other transceivers operates in an adjacent frequency band. In such embodiments, the shared broadcast channel may be located within the adjacent frequency band.

BRIEF DESCRIPTION OF THE DRAWINGS

The objects and advantages of the invention will be understood by reading the following detailed description in conjunction with the drawings in which:

FIG. 6 is a table listing characteristics of exemplary systems envisioned for the 2.4 GHz band.

DETAILED DESCRIPTION

Figure 1:
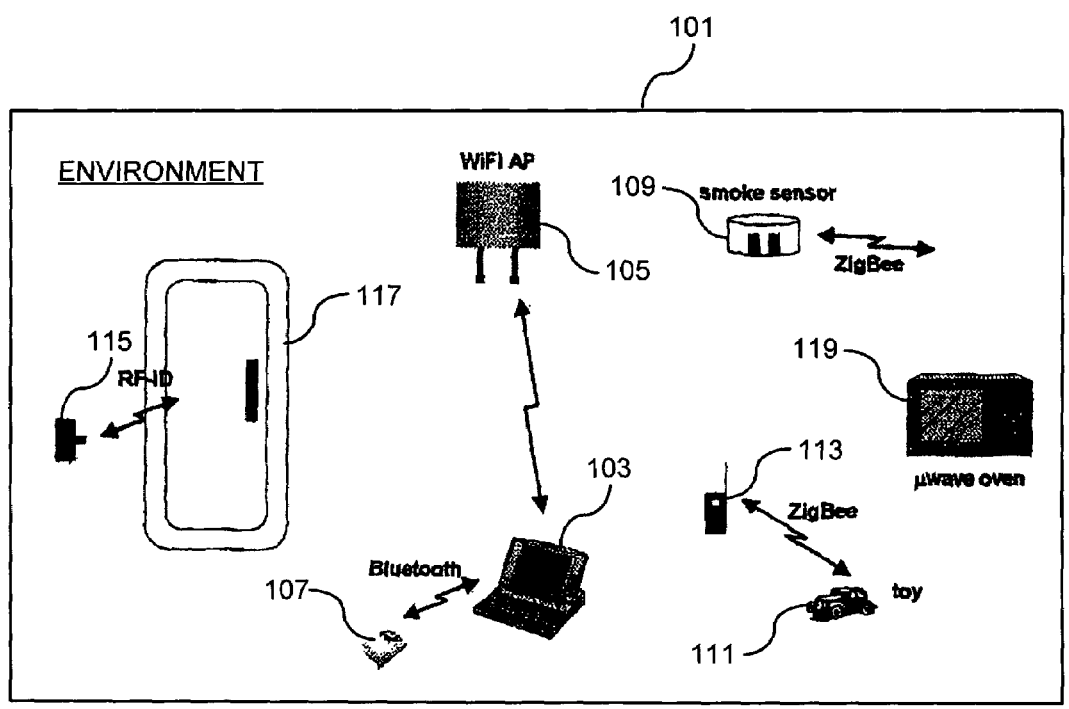
FIG. 1 depicts a future home environment including wireless communications in the 2.4 GHz band.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Collaborative techniques are disclosed herein that can be used by wireless communication devices operating in accordance with different standards. These techniques allow systems operating in accordance with differing standards to coexist simultaneously in the same frequency spectrum in the same geographical area.

A shared broadcast control channel is described that is used by different transmitters sharing the same spectrum in order to announce their presence to one another. In a time-division-multiplex fashion, the transmitters transmit a packet on the shared broadcast control channel revealing their use of the spectrum in terms of carrier frequency, bandwidth, time duration, and/or duty cycle. In some embodiments the signaling format used satisfies two requirements: it can be generated by the conventional transmitters designed for use with respective ones of the differing standards, and it can be received by the conventional receivers designed for use with respective ones of the differing standards. In alternative embodiments, the packet may comprise several segments with different signaling formats targeting different receiver types. As new systems are introduced that cannot cope with the current signaling formats, new packet segments can be added to accommodate the new signaling formats. It is often possible to implement the techniques described herein with only software or firmware changes in the existing transceivers. Standard hardware can be used. In some embodiments, the signaling format makes use of a narrowband, continuous phase modulation (CPM) technique. These and other aspects and embodiments will now be described in greater detail.

Back in the 1984/1985 time frame, the first developments were started for a system providing wireless access to an Ethernet backbone for office applications. This WLAN (Wireless Local Area Network) system, now marketed as WiFi, has become a very appealing tool for both business and private users, because it provides a fast and in some circumstances free-of-charge way of wireless surfing over the Internet. A laptop equipped with a WLAN PCMCIA (or built-in) card and in range of a WLAN access point is sufficient to become connected to the office network. The standard used for this system is part of the WLAN 802.11 family developed within the IEEE organization. Nowadays, different versions of the 802.11 system exist, including but not limited to 802.11b and 802.11g. These extensions provide higher data rates.

In 1994, the first developments were started for a system providing wireless connectivity between portable devices. This Wireless Personal Area Network (WPAN) system, now marketed as Bluetooth®, has become an appealing tool for users who want to interconnect their mobile phone with their headset, Personal Digital Assistant (PDA), laptop, and so on. The Bluetooth® technology has been standardized by the Bluetooth® Special Interest Group. Also within the Bluetooth® standard, several versions with higher data rates are being developed. What WLAN 802.11 technology and Bluetooth® technology have in common is that they make use of the 2.4 GHz Industrial Scientific Medical (ISM) band ranging from 2400 MHz to 2483.5 MHz. This band is available worldwide and no licenses are required for its use. Thus, it really is a global, free band. This has motivated a large number of others to make new communication systems for this band. For example, a number of high-rate WPAN standards are being developed within the IEEE in the 802.15.3 group. An association of companies called WiMedia promotes these standards for high-rate, multi-media applications. Yet another example is the low-rate WPAN standard, developed in the IEEE 802.15.4 group. This standard is promoted by an association of companies called ZigBee, which targets sensor systems, industrial automation, and toys. In addition, other systems are working in the 2.4 GHz ISM band, such as RF-ID, cordless phones (e.g., the Personal Wireless Telephony, or "PWT", standard which is a Digital Enhanced Cordless Telecommunications (DECT) variant in the US), and Wireless Local Loops ("WLL"—standardized in the IEEE 802.16a group and promoted by the WiMax alliance).

It will be understood that all of these systems need to share the same 2.4 GHz ISM band which is just a little over 80 MHz wide. In addition, high data rates and assurance of minimum quality of service (QoS) are envisioned. In 2003, the number of WLAN units shipped approached 30 million whereas the number of Bluetooth® units shipped exceeded 65 million. It is clear that, when the new systems are taken into account, a collapse of the band may be expected in some areas because of the vast number of units requiring capacity.

An example is shown in FIG. 1, which depicts a future home environment 101 including wireless communications in the 2.4 GHz band. In this environment, such as a kitchen, a laptop 103 on the counter keeps wireless contact via WiFi with the home network 105 in order to access recipes at a central database (e.g., the home PC—not shown). The laptop 101 has a wireless mouse 107 using wireless Bluetooth® technology. The smoke detector 109 in the kitchen repeatedly transmits a signal via ZigBee technology to a central control hub (not shown) in the house. A child plays with his car 111 which is remote controlled by a wireless controller 113, also via ZigBee technology. An RF-ID unit 115 is located near the refrigerator 117 to track the products going in and out. Finally, a microwave oven 119 is in operation to heat the food.

Figure 2:
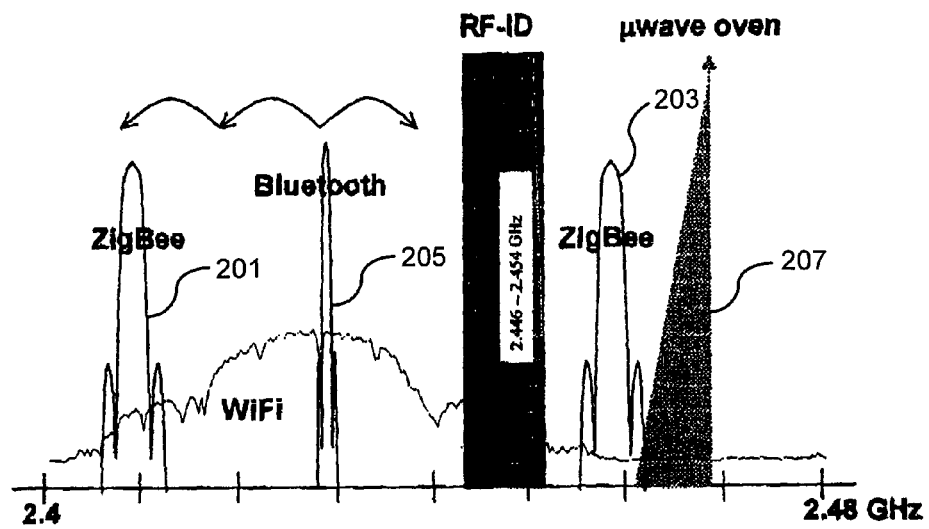
FIG. 2 is a graph illustrating an exemplary future home environment interference situation in the 2.4 GHz band.

FIG. 2 is a graph illustrating an exemplary future home environment interference situation in the 2.4 GHz band, based on the environment 101 depicted in FIG. 1. In particular, the power spectra of the different systems are shown. There are two ZigBee channels 201, 203: one for the remote-controlled toy car 111, and the other for the smoke detector 109. Most spectra are static and concentrated around a fixed carrier. The Bluetooth® technology 205 is frequency hopping. The microwave signal 207 is sweeping during the turn-on and turn-off transitions of the main cycle. The mutual interference impact will depend on the activity in the time domain (when the units are "on"), on the transmit power levels, and on the relative distances between transmitters and receivers. Bluetooth® technology now has means to avoid the WLAN and other systems by the use of adaptive frequency hopping (AFH). However, AFH is a non-collaborative technique, and its performance depends on how well the Bluetooth® system detects the WLAN. When the number of independent systems grows, non-collaborative techniques will not suffice, and operation can even become unstable when systems react to each other in an uncontrollable way.

Figure 3:
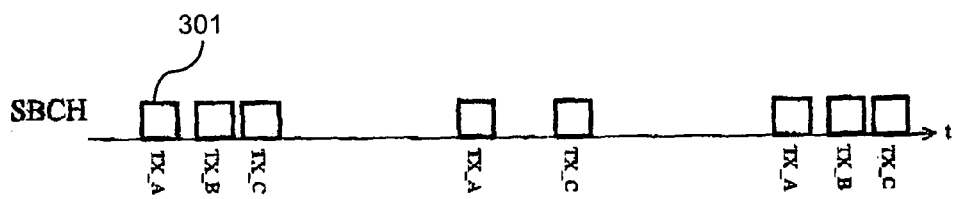
FIG. 3 is timing diagram of exemplary usage of a shared broadcast control channel (SBCH) with three systems (A, B and C) assumed.

Therefore, a collaborative technique is now proposed in this disclosure which uses a shared broadcast control channel (SBCH). The SBCH is a narrowband channel which can be placed anywhere in the spectrum, but once established at a particular frequency (e.g., a dynamically selected frequency) it preferably remains at that same frequency. The SBCH is characterized by having each system contribute to the signal. For example, every system in its turn broadcasts a message on the SBCH as shown in the timing diagram of FIG. 3. In FIG. 3 three systems, identified as A, B, and C, each broadcast a message, such as system A's message 301. Each message includes the characteristics of its corresponding system. These characteristics include information of relevance to other systems for helping those other systems to adjust their own operation to avoid or at least reduce interference. Examples of such characteristics are: the carrier frequency that the system is using for its traffic, the bandwidth occupied, the duty cycle, the transmit power level, a spreading factor being used, a spreading code being used and the like. It may even include the periodicity and phase of the broadcast message sent on the SBCH so that the transmissions of other systems that want to use the SBCH do not collide. (In this particular context, the term "phase" is used to mean some indicator of a point in time relative to another point in time.)

The periodicity of the broadcast message can vary quite a bit. For example, it may be designed to range from less than a second to several minutes. A longer period may be used if it is desired to minimize the power consumption of the unit. Before a unit starts to send on a SBCH, it scans the ISM band to see if an SBCH already exists. If this is the case, it will use the same SBCH carrier and insert its message when there are no other broadcast transmissions. If there is no SBCH, it will search for an appropriate frequency (preferably a frequency where little background noise is experienced) and establish a new SBCH. In FIG. 3, there are three systems A, B, C that contribute to the SBCH. The units may use different standards, or some of them may use the same standard. The techniques described here can also be applied for systems all using the same standard but operating independently (i.e. in an uncoordinated fashion). The broadcast message may be sent at a fixed periodicity, or a unit may first listen until a message is received and then append its own message. A contention-resolution scheme may have to be implemented if the broadcast is done in this ad-hoc fashion. For ease of implementation, the broadcast messages may be designed to be aligned with all transmitters using the same periodicity (or an integer multiple thereof). The example of FIG. 3 further illustrates a unit B sending the broadcast message at a lower duty cycle than that of transmitters A and C. However, the transmissions are still aligned, meaning that they occur in the same sequence and timing relative to one another when transmitted, as shown in the figure.

Figure 4:
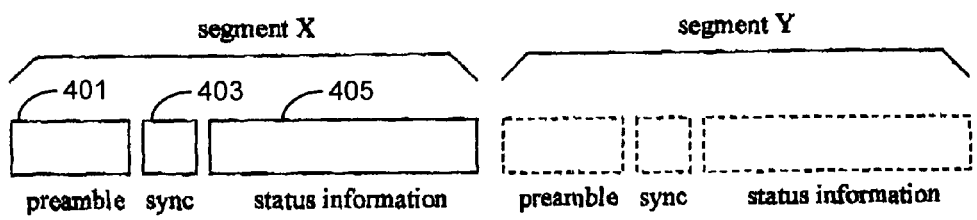
FIG. 4 is a schematic diagram of an exemplary packet format of a single message on a SBCH.

An exemplary packet format of the message is shown in FIG. 4. First there is a preamble 401 that provides known bit sequences for training and synchronizing the receiver of the message. Such techniques are well known in wireless communications, and need not be described herein in detail.

A sync field 403 follows to indicate the start of the information. Then the information 405 follows. This information reveals the usage of the ISM band of the system (e.g., the system A) that broadcasts the message with status information of the system (e.g., status information of system A). As mentioned earlier, this may include the carrier frequency being used, the bandwidth occupied, the duty cycle, and a few more characteristics. For the entire message a particular signaling format is used, which is suitable for the other systems' receiver(s) to decode.

In another aspect, if the other systems (e.g., systems B and C in our example) use a standard that has no commonalities whatsoever, then the message broadcast by system A may comprise two segments X and Y, each dedicated to a particular type of receiver. The same informational content is repeated but using different signaling formats in the different segments X and Y. So in the example of FIG. 4, segment X contains information that can only be read by system B and segment Y contains information that can only be read by system C.

The signaling format will now be described in greater detail. In principle, it is preferred that the desired format satisfy two requirements:

it should be capable of being generated by transmitters designed in accordance with each standard; and it should be capable of being decoded by receivers designed in accordance with each standard.

Figure 5A:
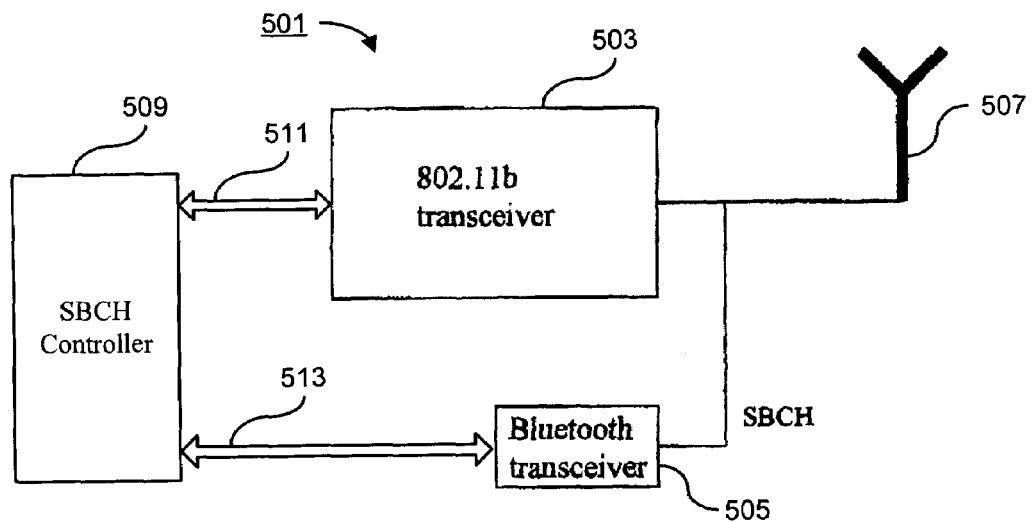
FIG. 5a is a block diagram of an exemplary dual-radio system according to an embodiment.

A straightforward method for achieving this is to select one standard and implement that in each system. For example, one could place a Bluetooth® transceiver in any device that has a communication system operating in the 2.4 GHz ISM band. This results in a dual-radio device of which an example is given in FIG. 5a. The exemplary device 501 is intended to operate as a WiFi device in accordance with IEEE 803.11b standards. Accordingly, the device 501 includes an 802.11b transceiver 503. However, to enable the device to operate on the SBCH as described herein in this example, the device 501 is designed to further include a Bluetooth® transceiver 505. For efficiency of design, the 802.11b transceiver 503 and the Bluetooth® transceiver 505 share a common antenna 507.

Complete Bluetooth® radios are reaching price levels below $2.50, and thus add little cost to the products they are placed in. Alternatively, a stripped-down Bluetooth® radio could be incorporated into the device 501 since it is necessary only to transmit and receive a simple message on the SBCH, thus further lowering the price. The choice is up to the designer: the Bluetooth® radio would be needed mainly for handling the SBCH signals (transmission and reception), but could of course also be used for conventional Bluetooth® applications.

An SBCH controller 509 is also provided for communicating information and controlling operation of the 802.11b transceiver 503 and the Bluetooth® transceiver 505 in accordance with the principles described herein. An interface 511 between the SBCH controller 509 and the 802.11b transceiver 503, and an interface 513 between the SBCH controller 509 and the Bluetooth® transceiver 505 carry the received status information regarding the other systems' usage of the ISM band as well as other controller information and signals. The host radio can then act accordingly, using any known interference reduction/avoidance strategy. Conversely, the host radio (e.g., the 802.11b transceiver 503 in the example of FIG. 5a) can, via the SBCH controller 509, give the Bluetooth® radio the information to be broadcast on the SBCH.

Figure 5B:
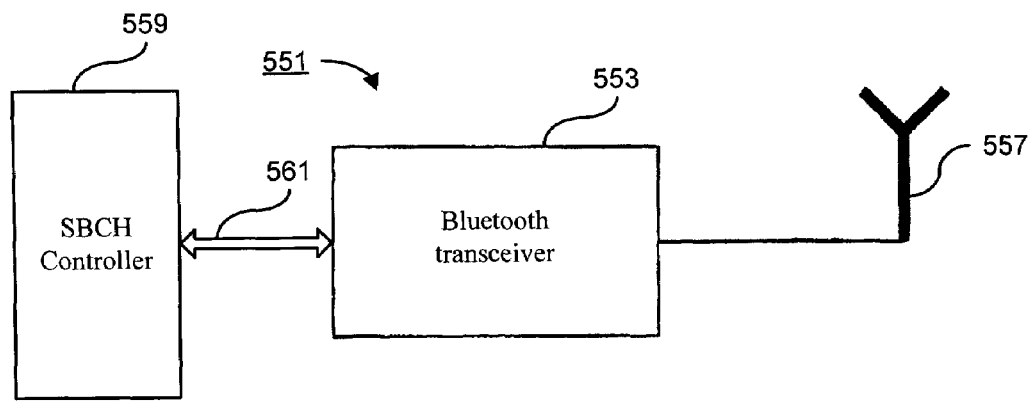
FIG. 5b is a block diagram of an exemplary radio system according to an alternative embodiment.

In the event that a transceiver is intended to convey its normal traffic in accordance with the Bluetooth® standards, one might use the exemplary device 551 depicted in the block diagram of FIG. 5b. Here, a Bluetooth® transceiver 553 connected to an antenna 557 is provided that serves dual purposes: communicating traffic in accordance with the Bluetooth® standards, and also participating in the SBCH in accordance with the principles described herein. To control the Bluetooth® transceiver's operations with respect to the SBCH, an SBCH controller 559 is provided. Based on the information provided by the Bluetooth® transceiver 553 to the SBCH controller 559 via the control and data link 561, the SBCH controller 559 is able to cause the Bluetooth® transceiver 553 to takes steps to avoid interference with other devices as detected by the SBCH.

Of course, in the above discussion, the selection of Bluetooth® technology for use in communicating on the SBCH is merely intended as an example; transceivers operating in accordance with other standards could be used instead.

Alternative embodiments will now be described that utilizes a signaling format that satisfies the requirements given before without the need for an additional radio transceiver. To achieve this goal, the least common denominator of all transmitters and receivers used in the different standards should be found. First, consider the bandwidth of such a signaling format. A wideband receiver can receive a wideband signal and a narrowband signal. By contrast, a narrowband receiver can only receive a narrowband signal. Thus, the signaling format should be narrowband to allow both narrowband and wideband receivers to decode the message. Narrowband signaling will limit the information rate, but this is not a serious issue because the amount of information to be communicated on the SBCH is small (e.g., a few tens of bytes).

Now consider the type of modulation to be used in the signaling format. A frequency carrier can be modulated in amplitude and/or phase. Many of the standards, for example those that define Bluetooth® technology, use only a phase modulation. The receivers operating in accordance with such standards are frequently equipped with hard-limiters that strip away any amplitude information. The signaling should therefore only apply phase modulation (or frequency modulation, which is regarded as a form of phase modulation).

FIG. 6 depicts a table showing a list of exemplary different systems that make use of the 2.4 GHz ISM band. It also shows the characteristics of the signaling that they use. For 802.11g technology, only the QPSK modulation is mentioned. Other modulation schemes like 16-QAM and 64-QAM are supported as well, but they are of less interest since there is an amplitude component in those modulation schemes.

Figure 7:
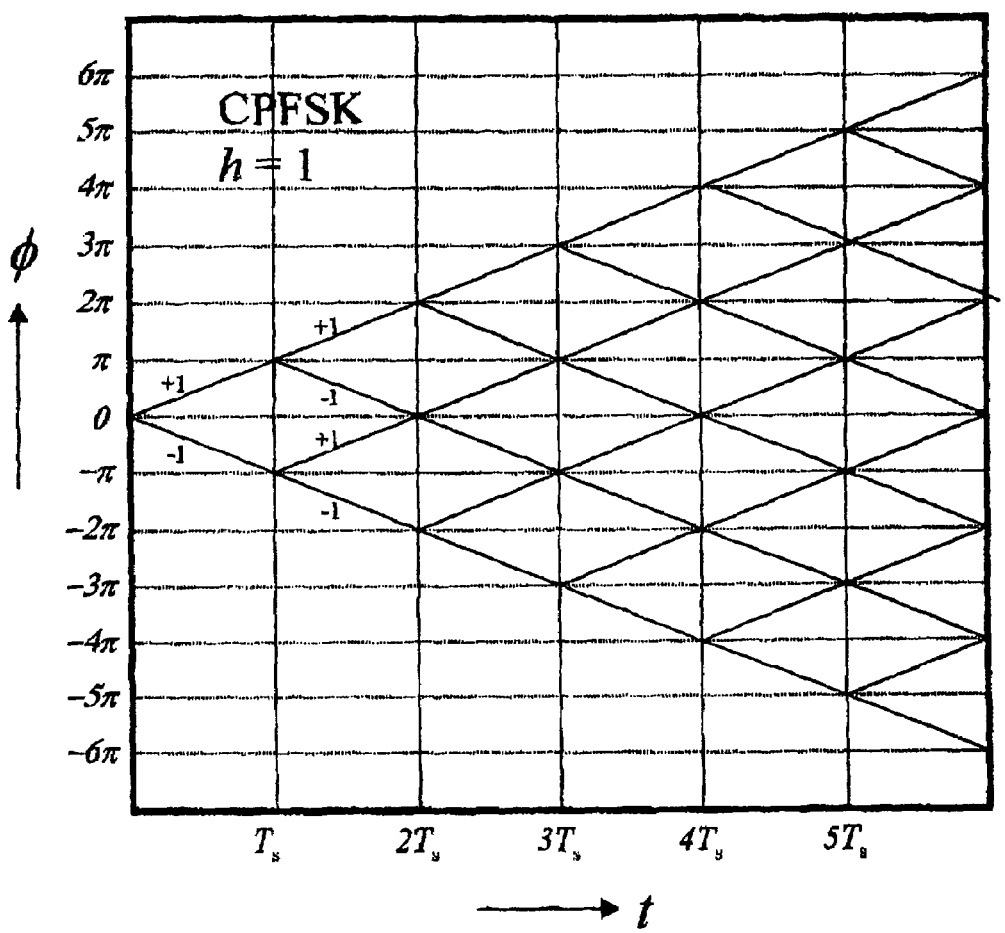
FIG. 7 is a phase trellis diagram of a binary CPFSK signal with a CPM modulation index of h=1.

In the following exemplary embodiments, Continuous Phase Modulation (CPM) will be used as the signaling format that can be generated and decoded by each system for communicating on the SBCH. In CPM, the information is solely carried in the phase. In addition, the phase changes smoothly. A very simple form of CPM is binary Continuous Phase Frequency Shift Keying (CPFSK) where the phase changes per symbol in a very simple way:

$$\Delta\phi_k = \pi \cdot h \cdot b_k$$

where h is the CPM modulation index and $b_k$ is the information bit (either 1 or −1). By the term "CPM modulation index" is meant a value representing the maximum phase rotation over one symbol time. See Proakis, "Digital Communications", $2^{nd}$ Edition, McGraw-Hill, 1989 (ISBN 0-07-100269-3) for more background information about this type of modulation. To illustrate the nature of the modulated signal, a phase trellis of a binary CPFSK signal with h=1 is shown in FIG. 7. It can be seen that with each new symbol, the phase of the signal is changed by either plus or minus π, based on whether the symbol to be transmitted is a plus or minus 1.

The (shaped) modulation formats in the list of FIG. 6 are all related to the CPM format. The Gaussian Frequency Shift Keying (GFSK) modulation used in Bluetooth® technology can be considered a CPFSK with a modulation index, h, between 0.28 and 0.35. The modulation of IEEE 802.15.4 technology uses Minimum Shift Keying (MSK), which is CPFSK with h=0.5. Also, the Quadrature Phase Shift Keying (QPSK) schemes used by the 802.11 technology and by the more advanced versions of Bluetooth® technology are related to the CPFSK with h=0.5.

The SBCH signaling has to be generated by systems using different modulation indices h and different symbol times $T_s$. The SBCH signaling should therefore have a modulation index h much larger than the largest $h_{max}$ used by any of the standards. In addition, the SBCH signaling should use a symbol time $T_s$ much larger than the largest symbol time $T_{s\_max}$ used by any of the standards. In the example given above, $h_{max}=0.5$ and $T_{s\_max}=4$ µs. Merely as an example, then, for the SBCH a modulation index h=4 is chosen and a symbol time $T_s=17$ μs is chosen. Because of the latter symbol time, the information rate is limited to 59 kb/s.

Figure 8A:
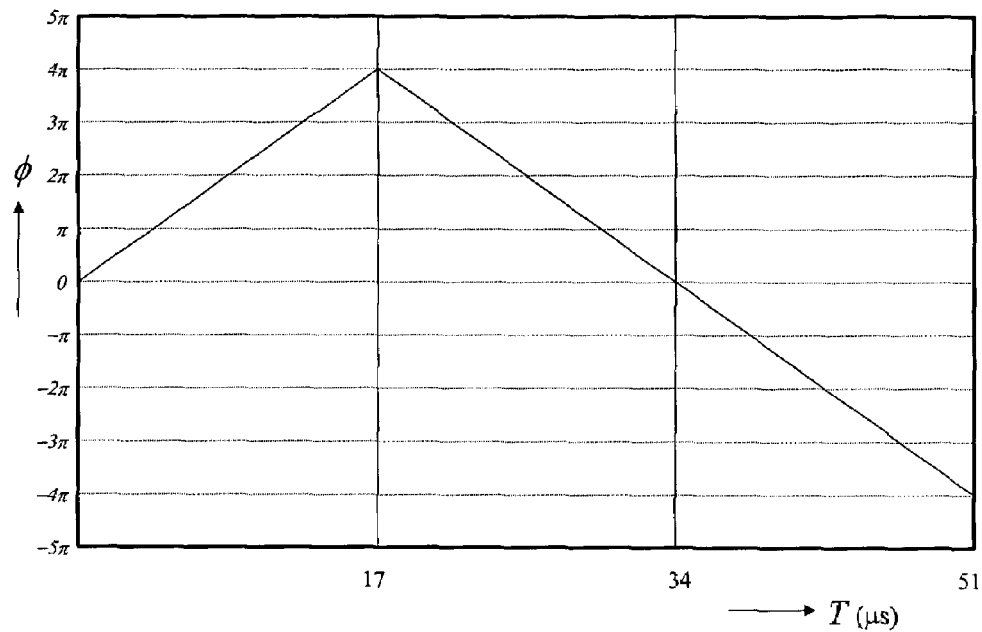
FIG. 8a is a phase diagram of an exemplary narrowband CPM signal generated with a required phase trajectory.

FIG. 8a is an exemplary phase trajectory that would result from a bit sequence of {1, −1, −1} sent at the SCBH, assuming that h=4 and $T_s=17$ μs as selected above. In the figure, it can be seen that the phase increases by 4π over the first 17 μs to represent the +1; decreases by 4π over the next 17 μs to represent the −1; and decreases by an additional 4π over the third 17 μs interval to represent the next −1 value. It is desired to transmit and receive this signal (or at least a good approximation of it) in each of the systems that are to communicate on the SBCH. In particular, where a given transceiver's circuitry does not normally generate or receive a signal having the modulation index and symbol time chosen for use on the SBCH, that transceiver's transmitter circuitry is operated in a manner that generates a signal approximating the desired waveform. Similarly, reception of another transceivers SBCH signal is performed using the transceiver's own incompatible circuitry, with the output of the transceiver being processed in a manner that enables the information conveyed by the received signal to be extracted.

Figure 8B:
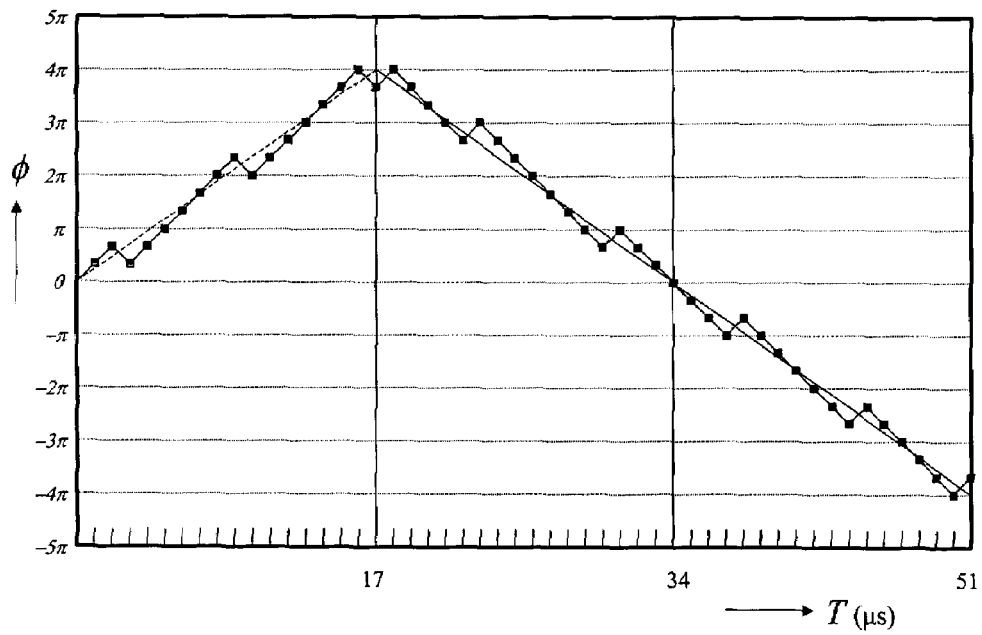
FIG. 8b is a phase diagram of an exemplary narrowband CPM signal generated with a phase trajectory created by a Bluetooth® transmitter.
Figure 8C:
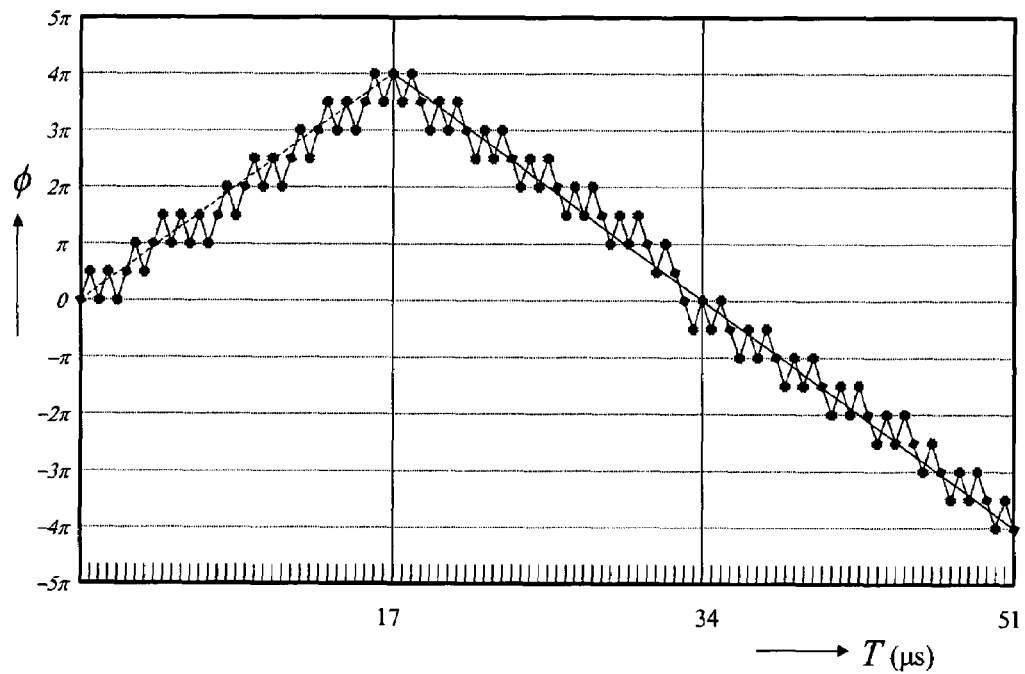
FIG. 8c is a phase diagram of an exemplary narrowband CPM signal generated with a phase trajectory created by a WLAN 802.11b transmitter.
Figure 8D:
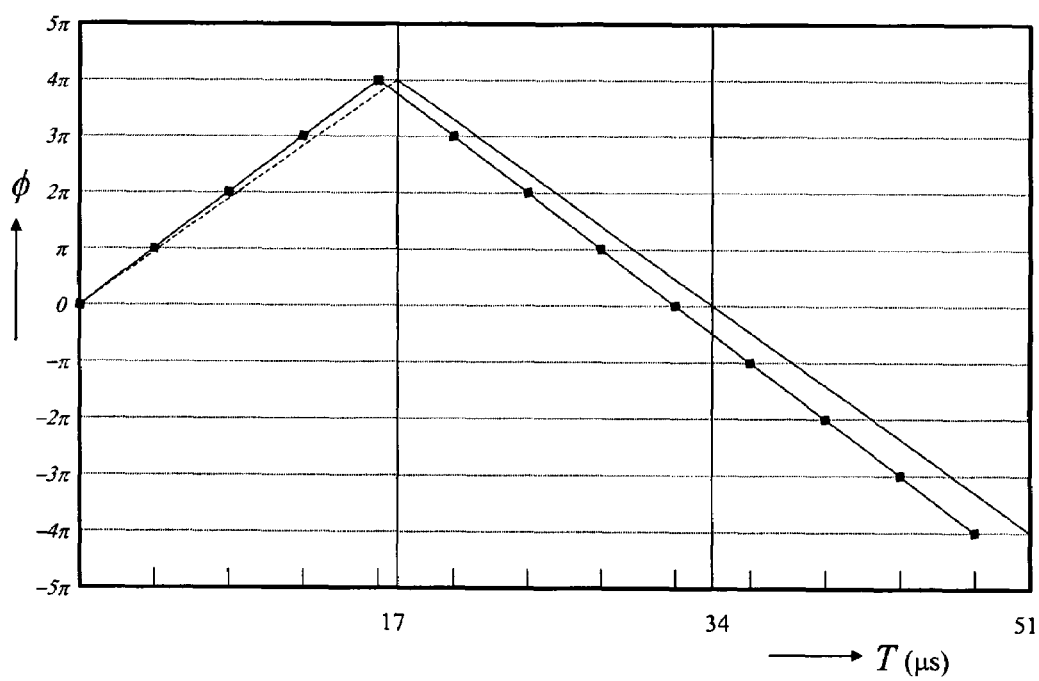
FIG. 8d is a phase diagram of an exemplary narrowband CPM signal generated with a phase trajectory created by a WLAN 802.11g transmitter in accordance with an alternative embodiment.

To illustrate this, in FIGS. 8b, 8c, and 8d are shown the phase trajectories created by a Bluetooth® transmitter, a WLAN 802.11b transmitter, and a WLAN 802.11g transmitter, respectively. The standard systems track the CPM phase waveform via a delta modulation technique, in which for each step the deviation is kept as small as possible. The time step is determined by the symbol time in each standard, and the phase step is determined by the modulation index h. So for Bluetooth® technology, the time step is $T_{s\_Bluetooth}=1$ μs, and the phase step is hπ=0.3 π. For WLAN 802.11b technology, it is assumed that the technology also supports the old IEEE 802.11 standard with the direct-sequence spreading scheme at 11 Mchips/s and data rates of 1 and 2 Mb/s. The header of the 802.11b packets run at a modulation rate of 1 Mb/s whereas the payload applies the higher data rates of 5.5 Mb/s and 11 Mb/s. If the Barker sequence spreading is turned off, the 2 Mb/s QPSK scheme can be applied which renders $T_{s\_802.11b}=0.5$ μs and hπ=π/2. For 802.11g technology, a symbol duration of 4 μs (including the cyclic prefix) and QPSK (h=0.5) are assumed.

Given these various modulation characteristics in the different equipment, the {1, −1, −1} data sequence in CPM (sent at a symbol rate of approximately 29 kb/s and illustrated in FIG. 8a) is approximated by applying a symbol sequence of {1 1 −1 1 1 1 . . . −1−1−1 1} in system A (assumed to be Bluetooth® technology); applying a {1 −1 1 −1 1 1 −1 . . . −1 1 −1} symbol sequence in system B (assumed to be WLAN 802.11b technology), and a {1 1 1 1 . . . −1 −1 −1} symbol sequence in system C (assumed to be WLAN 802.11g technology).

Figure 9:
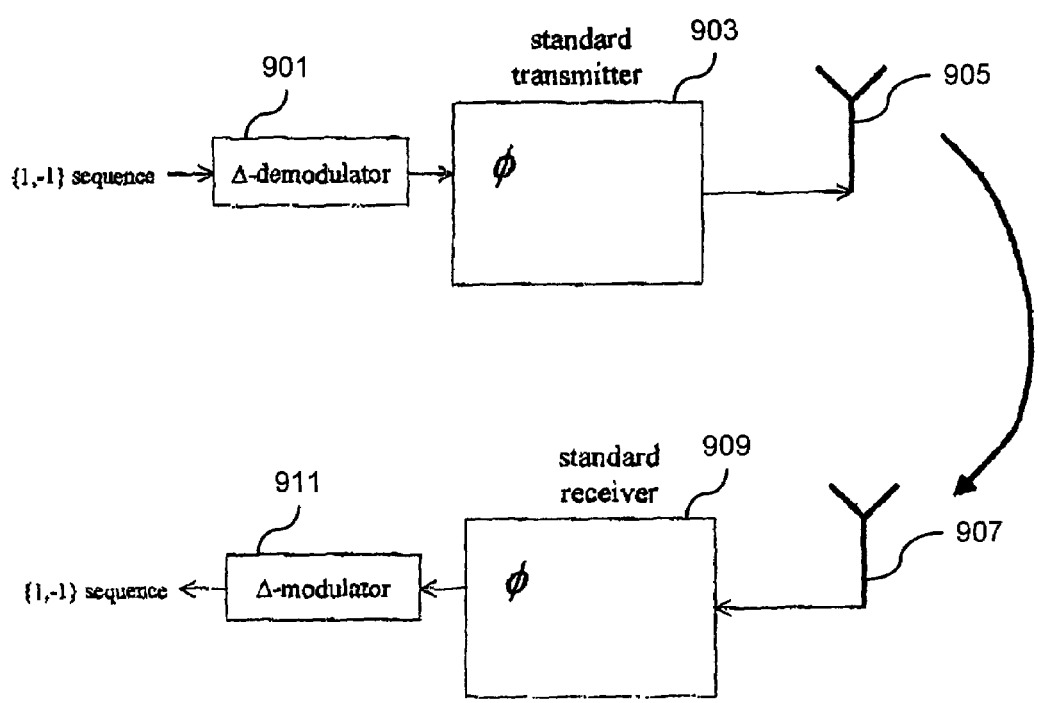
FIG. 9 is a block diagram of an exemplary transmitter and receiver configuration according to an alternative embodiment.

As is shown in FIGS. 8b, 8c, and 8d, by transmitting a suitable string of symbols in the standard transmitters, the desired narrowband CPM signals can be approximated. FIG. 9 is a block diagram of an exemplary hardware arrangement for accomplishing this. On the transmitter side, the suitable string of symbols is supplied to a delta demodulator 901 whose output is then fed to the transmitter 903. The modulated signal at the output of the transmitter 903 is supplied to the channel via an antenna 905. For each standard, a proper symbol sequence can be found. In exemplary embodiments, each symbol sequence (one for plus 1, one for minus 1) for a given standard may be stored in a memory device so that they may be retrieved when needed.

At the receiver side, the reverse operations take place. An antenna 907 receives the signal and supplies it to a standard receiver 909, which recovers the phase of the received signal. This information is then supplied to a delta modulator 911, which generates therefrom the symbol values. Low-pass filtering (not shown) the digital signal will then render the desired broadcast information.

FIG. 9 only conceptually shows how the phase, φ, is generated and tracked. In state of the art implementations, I and Q inputs and outputs may be present which obviate the need for explicit delta-demodulators and delta-modulators. That is, a complex receiver would not need to map the input signal to a phase signal which is then run through delta modulators; instead, all processing of the complex signal would be performed in the complex (I/Q) domain.

It would be most convenient to have systems in which the broadcast message sent by each transmitter on the SBCH consists of only a single segment applying CPM signaling. However, it is anticipated that new systems that will be developed in the future may not be able to decode the CPM signaling that is presently suitable for all current standards. To be able to accommodate the presence of any such new systems, embodiments can be implemented in which a new segment is added as shown in FIG. 4, wherein the new segment is generated specifically for the new system with a different signaling format than that used on the SBCH before.

Figure 10:
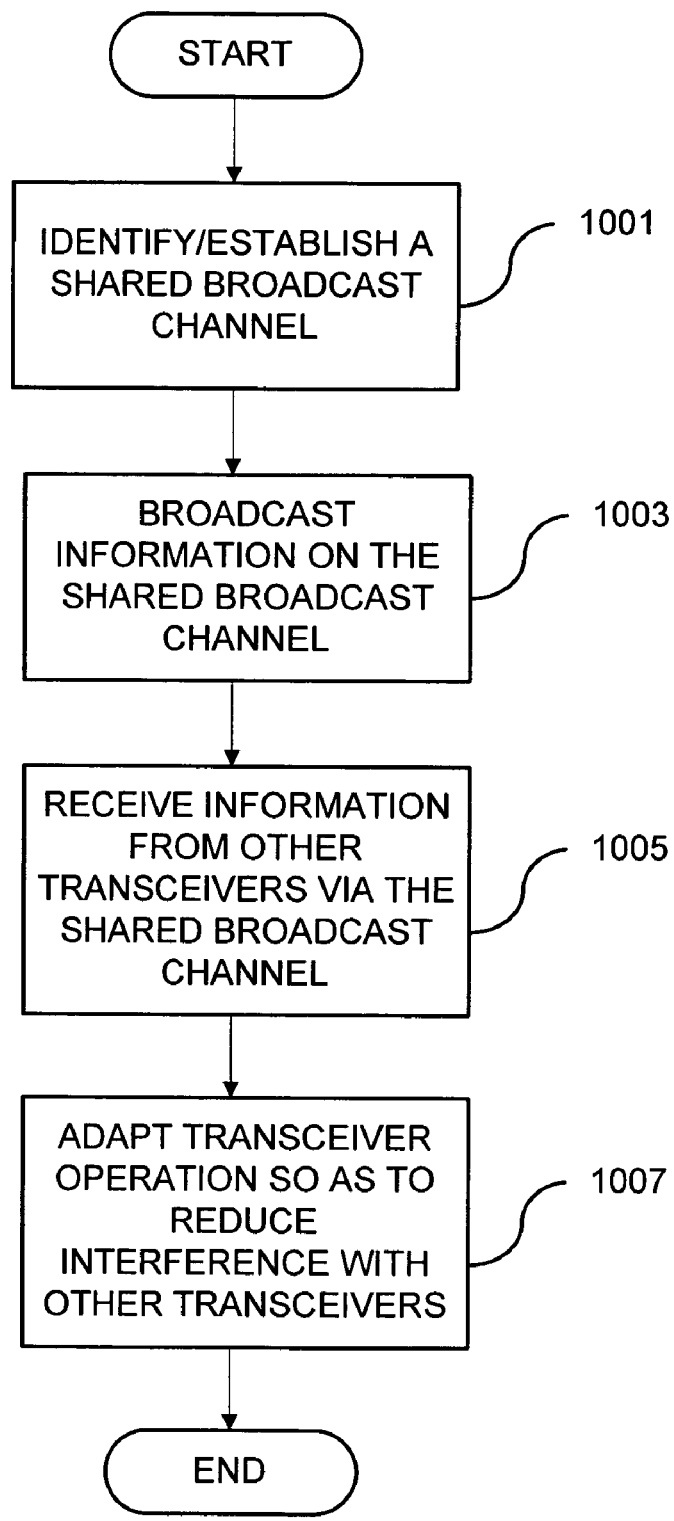
FIG. 10 is a high-level flow diagram of exemplary operations carried out in any of the transceivers intended for operation in an environment with other, incompatible transceivers.

FIG. 10 is a high-level flow diagram of exemplary operations carried out in any of the transceivers intended for operation in an environment with other, incompatible transceivers. An initial process involves identifying the SBCH (step 1001). As mentioned earlier, this can involve scanning the available frequency band to determine whether the SBCH has already been established (e.g., by detecting that one or more other transceivers are already broadcasting on it). If one is detected, it is then used. If none is detected, the transceiver can establish one of its own by selecting a carrier frequency to be used.

The exemplary transceiver then periodically broadcasts its pertinent information on the SBCH (step 1003). This enables other transceivers to detect the presence of the exemplary transceiver, and to use the information to adapt their own operation to avoid interference with the exemplary transceiver.

The exemplary transceiver also receives information broadcast by other transceivers on the SBCH (step 1005). The information received may be used by the exemplary transceiver to adapt its own operation so as to avoid interference with the other transceivers (step 1007). This adaptation may include how and/or when the exemplary transceiver transmits information. The adaptation may alternatively or in addition include how and/or when the exemplary transceiver will receive traffic from its intended source(s).

The various techniques described above are not limited to application only in multiple systems that share the same radio spectrum. To the contrary, these techniques may also be applied in systems that operate in adjacent bands but which still interfere with one another. An example is found with the new Universal Mobile Telecommunications System (UMTS) band envisioned at a band from 2500 MHz to 2690 MHz. This is just above the 2.4 GHz ISM band which ranges from 2400 MHz to 2483.5 MHz. Nonetheless, when two radios come very close to each other, for example a UMTS phone with a built-in Bluetooth® radio, near-far problems cause one of the radios to stop operating. This can be caused by saturation (clipping) of the receiver of one radio due to the high transmit power of the other radio, or because spectral noise levels increase and raise the noise floor.

To enable alleviation of this problem, the UMTS radio could, for example, contribute to the SBCH to announce its presence. That is, the UMTS radio would transmit a signal in the 2.4 GHz band revealing its communications in the 2.5

GHz band. Units operating in the 2.4 GHz band could than respond by positioning their signals in the lower part of the ISM band or by refraining from communications all together.

In the unlicensed 2.4 GHz ISM band, rules have been established with which the systems must comply. In the United States, it is the FCC part 15 rules that the systems have to adhere to; in Europe, the rules are described in the ETSI document ETS 300-328. For power levels above 0 dBm, signal spreading is required. If necessary, additional coding or spreading can be applied on the SBCH's CPM signaling by considering the created symbols shown in FIG. 8a as chips of a spreading sequence. The information rate will then be further reduced.

In addition, governing bodies such as the United States' FCC specify maximum average power level limits with respect to single transmitters. One could therefore rely on each transceiver having only a very low duty cycle for transmitting messages on the SBCH because each transceiver's average output power level will be low. It may be observed that when several transmitters concatenate their messages on the SBCH, the average power level on the channel goes up and may exceed regulated maximum levels; this does not violate regulations, however, since those regulations govern the operations of only single transmitters, not the combined effects of multiple transmitters on a shared channel.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first transceiver in a wireless communication environment capable of including one or more other transceivers, wherein the first transceiver sends and receives traffic in accordance with a first communications standard, and one or more of the one or more other transceivers send and receive traffic in accordance with one or more other communication standards that are incompatible with the first communications standard such that traffic sent in accordance with any of the first and other communications standards cannot be received by a receiver operating in accordance with any other one of the first and other communications standards, the method comprising:

identifying a carrier frequency for use as a shared broadcast channel that is accessible by the first transceiver and by the one or more other transceivers; and broadcasting information on the shared broadcast channel, wherein the information informs the one or more other transceivers of the presence of the first transceiver, wherein broadcasting the information on the shared broadcast channel comprises:

approximating a signaling format that is used or approximated by all of the first and other transceivers to broadcast information on and receive information from the shared broadcast channel.

2. The method of claim 1, wherein identifying the carrier frequency comprises:

scanning a predefined radio band to determine whether any of the one or more other transceivers have broadcast information on the shared broadcast channel.

3. The method of claim 2, comprising:

selecting a frequency within the predefined radio band and establishing the shared broadcast channel in response to determining that none of the other transceivers has broadcast information on the shared broadcast channel.

4. The method of claim 1, wherein the information comprises an identifier of a carrier frequency that the first transceiver is using to communicate traffic.

5. The method of claim 1, wherein the information comprises an identifier of a bandwidth being occupied by the first transceiver.

6. The method of claim 1, wherein the information comprises an identifier of a duty cycle of operation on a radio spectrum by the first transceiver.

7. The method of claim 1, wherein the information comprises an identifier of a transmit power level being used by the first transceiver.

8. The method of claim 1, wherein the information comprises an identifier of a periodicity with which the information is being broadcast on the shared broadcast channel.

9. The method of claim 1, wherein the information comprises an identifier of a first point in time relative to another point in time, the first point in time being a point in time that the information is being broadcast on the shared broadcast channel.

10. The method of claim 1, wherein the information comprises an identifier of a spreading factor being used by the first transceiver.

11. The method of claim 1, wherein the information comprises an identifier of a spreading code being used by the first transceiver.

12. The method of claim 1, wherein the information comprises an identifier of a characteristic of the first transceiver that enables the one or more other transceivers to adjust operation to achieve a reduction of interference with the first transceiver.

13. The method of claim 1, wherein broadcasting information on the shared broadcast channel comprises:

broadcasting a first segment on the shared broadcast channel by using a first signaling format to broadcast the information on the shared broadcast channel; and broadcasting a second segment on the shared broadcast channel by using a second signaling format to broadcast the information on the shared broadcast channel, wherein the first signaling format is different from the second signaling format.

14. The method of claim 1, wherein broadcasting the information on the shared broadcast channel comprises:

approximating a continuous phase modulation (CPM) signaling format having a CPM modulation index that is larger than a largest CPM modulation index used by any of the first and other communications standards, and having a symbol time that is larger than the largest symbol time used by any of the first and other communications standards.

15. The method of claim 14, wherein approximating the continuous phase modulation (CPM) signaling format having the CPM modulation index that is larger than the largest CPM modulation index used by any of the first and other communications standards, and having the symbol time that is larger than the largest symbol time used by any of the first and other communications standards comprises:

for each bit of information contained in the information to be broadcast on the shared broadcast channel, substituting a corresponding symbol sequence; and supplying each corresponding symbol sequence to a transmitter unit operating in accordance with the first communications standard.

16. The method of claim 15, comprising:
the transmitter unit generating, by means of delta demodulation, a signal waveform to be transmitted.

17. The method of claim 14, wherein the CPM signaling format is a continuous phase frequency shift keying signaling format.

18. The method of claim 1, wherein the first transceiver operates in a first frequency band, and at least one of the other transceivers operates in an adjacent frequency band.

19. The method of clam 18, wherein the shared broadcast channel is located within the adjacent frequency band.

20. A transceiver for use in a wireless communication environment capable of including one or more other transceivers, wherein the transceiver sends and receives traffic in accordance with a first communications standard, and one or more of the one or more other transceivers send and receive traffic in accordance with one or more other communication standards that are incompatible with the first communications standard such that traffic sent in accordance with any of the first and other communications standards cannot be received by a receiver operating in accordance with any other one of the first and other communications standards, the transceiver comprising:
logic that identifies a carrier frequency for use as a shared broadcast channel that is accessible by the transceiver and by the one or more other transceivers; and
logic that broadcasts information on the shared broadcast channel, wherein the information informs the one or more other transceivers of the presence of the transceiver.
wherein the logic that broadcasts the information on the shared broadcast channel comprises:
logic that approximates a signaling format that is approximated by all of the first and other transceivers to bradcast information on and receive information from the shared broadcast channel.

21. The transceiver of claim 20, wherein the logic that identifies the carrier frequency comprises:
logic that scans a predefined radio band to determine whether the shared broadcast channel is in use by any of the one or more other transceivers.

22. The transceiver of claim 21, comprising:
logic that selects a frequency within the predefined radio band and establishes the shared broadcast channel in response to determining that the shared broadcast channel is not in use by any of the other transceivers.

23. The transceiver of claim 20, wherein the information comprises an identifier of a carrier frequency that the transceiver is using to communicate traffic.

24. The transceiver of claim 20, wherein the information comprises an identifier of a bandwidth being occupied by the transceiver.

25. The transceiver of claim 20, wherein the information comprises an identifier of a duty cycle of operation on a radio spectrum by the transceiver.

26. The transceiver of claim 20, wherein the information comprises an identifier of a transmit power level being used by the transceiver.

27. The transceiver of claim 20, wherein the information comprises an identifier of a periodicity with which the information is being broadcast on the shared broadcast channel.

28. The transceiver of claim 20, wherein the information comprises an identifier of a first point in time relative to another point in time, the first point in time being a point in time that the information is being broadcast on the shared broadcast channel.

29. The transceiver of claim 20, wherein the information comprises an identifier of a spreading factor being used by the transceiver.

30. The transceiver of claim 20, wherein the information comprises an identifier of a spreading code being used by the transceiver.

31. The transceiver of claim 20, wherein the information comprises an identifier of a characteristic of the transceiver that enables the one or more other transceivers to adjust operation to achieve a reduction of interference with the transceiver.

32. The transceiver of claim 20, wherein the logic that broadcasts information on the shared broadcast channel comprises:
logic that broadcasts a first segment on the shared broadcast channel by using a first signaling format to broadcast the information on the shared broadcast channel; and
logic that broadcasts a second segment on the shared broadcast channel by using a second signaling format to broadcast the information on the shared broadcast channel,
wherein the first signaling format is different from the second signaling format.

33. The transceiver of claim 20, wherein the logic that broadcasts the information on the shared broadcast channel comprises:
logic that approximates a continuous phase modulation (CPM) signaling format having a CPM modulation index that is larger than a largest CPM modulation index used by any of the first and other communications standards, and having a symbol time that is larger than the largest symbol time used by any of the first and other communications standards.

34. The transceiver of claim 33, wherein the logic that approximates the continuous phase modulation (CPM) signaling format having the CPM modulation index that is larger than the largest CPM modulation index used by any of the first and other communications standards, and having the symbol time that is larger than the largest symbol time used by any of the first and other communications standards comprises:
logic that, for each bit of information contained in the information to be broadcast on the shared broadcast channel, substitutes a corresponding symbol sequence; and
logic that supplies each corresponding symbol sequence to a transmitter unit operating in accordance with the first communications standard.

35. The transceiver of claim 34, wherein the transmitter unit includes a delta demodulator that generates a signal waveform to be transmitted.

36. The method of claim 33, wherein the CPM signaling format is a continuous phase frequency shift keying signaling format.

37. The transceiver of claim 20, wherein the transceiver operates in a first frequency band, and at least one of the other transceivers operates in an adjacent frequency band.

38. The transceiver of claim 37, wherein the shared broadcast channel is located within the adjacent frequency band.

39. A transceiver for use in a wireless communication environment capable of including one or more other transceivers, wherein the transceiver sends and receives traffic in accordance with a first communications standard, and one or more of the one or more other transceivers send and receive traffic in accordance with one or more other communication standards that are incompatible with the first communications standard such that traffic sent in accordance with any of the first and other communications standards cannot be received by a receiver operating in accordance with any other one of the first and other communications standards, the transceiver comprising:
- logic that identifies a carrier frequency for use as a shared broadcast channel that is accessible by the transceiver and by the one or more other transceivers;
- logic that broadcasts information on the shared broadcast channel, wherein the information informs the one or more other transceivers of the presence of the transceiver; and
- logic that receives information from the shared broadcast channel, wherein the information informs the transceiver of the presence of the one or more other transceivers.
- wherein the logic that broadcast the information on the shared broadcast channel comprises:
  - logic that approximates a signaling format that is approximated by all of the first and other transceivers to broadcast information on and receive information from the shared broadcast channel.

40. The transceiver of claim 39, comprising:
- logic that, in response to receipt of the information informing the transceiver of the presence of the one or more other transceivers, adapts operation of the transceiver so as to reduce interference to and/or from the one or more other transceivers.

41. A machine readable storage medium having stored thereon a set of program instructions for operating a first transceiver in a wireless communication environment capable of including one or more other transceivers, wherein the first transceiver sends and receives traffic in accordance with a first communications standard, and one or more of the one or more other transceivers send and receive traffic in accordance with one or more other communication standards that are incompatible with the first communications standard such that traffic sent in accordance with any of the first and other communications standards cannot be received by a receiver operating in accordance with any other one of the first and other communications standards, the set of program instructions comprising instructions that cause a processor to operate transceiver logic to perform:
- identifying a carrier frequency for use as a shared broadcast channel that is accessible by the first transceiver and by the one or more other transceivers; and
- broadcasting information on the shared broadcast channel, wherein the information informs the one or more other transceivers of the presence of the first transceiver.
- wherein broadcasting the information on the shared broadcast channel comprises:
  - approximating a signaling format that is used or approximated by all of the first and other transceivers to broadcast information on and receive information from the shared broadcast channel.

* * * * *

UNITED STATES PATENT AND TRADEMARK OFFICE
CERTIFICATE OF CORRECTION

PATENT NO.       : 7,480,490 B2
APPLICATION NO.  : 11/021164
DATED            : January 20, 2009
INVENTOR(S)      : Haartsen It is certified that error appears in the above-identified patent and that said Letters Patent is hereby corrected as shown below:

In Fig. 6, Sheet 4 of 9, in Line 1 of the heading, delete "moduation" and insert -- modulation --, therefor.

In Column 13, Line 47, in Claim 1, delete "received" and insert -- decoded --, therefor.

In Column 13, Line 64, in Claim 2, after "whether" insert -- the shared broadcast channel is in use by --.

In Column 13, Lines 65-66, in Claim 2, after "transceivers" delete "have broadcast information on the shared broadcast channel".

In Column 14, Line 3, in Claim 3, after "determining that" delete "none" and insert -- the shared broadcast channel is not in use by any --, therefor.

In Column 14, Lines 3-4, in Claim 3, after "other transceivers" delete "has broadcast information on the shared broadcast channel".

In Column 15, Line 20, in Claim 20, delete "received" and insert -- decoded --, therefor.

In Column 15, Lines 29-30, in Claim 20, delete "transceiver." and insert -- transceiver, --, therefor.

In Column 15, Line 33, in Claim 20, delete "approimates" and insert -- approximates --, therefor.

In Column 15, Line 35, in Claim 20, delete "bradcast" and insert -- broadcast --, therefor.

In Column 16, Line 52, in Claim 36, delete "method" and insert -- transceiver --, therefor.

In Column 16, Line 56, in Claim 37, delete "operates" and insert -- is adapted to operate --, therefor.

In Column 16, Line 57, in Claim 37, delete "operates" and insert -- is adapted to operate --, therefor.

UNITED STATES PATENT AND TRADEMARK OFFICE
CERTIFICATE OF CORRECTION

PATENT NO. : 7,480,490 B2
APPLICATION NO. : 11/021164
DATED : January 20, 2009
INVENTOR(S) : Haartsen It is certified that error appears in the above-identified patent and that said Letters Patent is hereby corrected as shown below:

In Column 17, Line 1, in Claim 39, delete "received" and insert -- decoded --, therefor.

In Column 17, Lines 15-16, in Claim 39, delete "transceivers." and insert -- transceivers, --, therefor.

In Column 17, Line 17, in Claim 39, delete "broadcast" and insert -- broadcasts --, therefor.

In Column 17, Line 26, in Claim 40, delete "adapts" and insert -- uses the information to adapt --, therefor.

In Column 18, Line 11, in Claim 41, delete "received" and insert -- decoded --, therefor.

In Column 18, Line 21, in Claim 41, delete "transceiver." and insert -- transceiver, --, therefor.

Signed and Sealed this

Twenty-sixth Day of May, 2009

JOHN DOLL
*Acting Director of the United States Patent and Trademark Office*